(12) United States Patent
Sun (10) Patent No.: US 8,070,433 B2
(45) Date of Patent: Dec. 6, 2011

(54) ENCLOSURE AND HEAT DISSIPATING DEVICE FOR THE SAME

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 668 days.

(21) Appl. No.: 12/238,032

(22) Filed: Sep. 25, 2008

(65) Prior Publication Data

US 2010/0046160 A1    Feb. 25, 2010

(30) Foreign Application Priority Data

Aug. 20, 2008   (CN) .......................... 2008 1 0304076

(51) Int. Cl.
*F01D 25/08* (2006.01)
*F01D 25/24* (2006.01)
*F01D 25/28* (2006.01)

(52) U.S. Cl. ...................... 415/213.1; 415/203; 415/204

(58) Field of Classification Search ............... 415/213.1, 415/214.1
See application file for complete search history.

(56) References Cited

U.S. PATENT DOCUMENTS

| 6,547,516 | B2 * | 4/2003 | Liu ................................ 415/108 |
| 6,805,626 | B2 | 10/2004 | Chen |
| 7,349,211 | B2 | 3/2008 | Chen et al. |
| 7,758,308 | B2 | 7/2010 | Wu et al. |
| 2006/0056965 | A1 * | 3/2006 | Li et al. ....................... 415/213.1 |
| 2008/0166230 | A1 * | 7/2008 | Lee ............................. 415/213.1 |

FOREIGN PATENT DOCUMENTS

| CN | 2623923 Y | 7/2004 |
| CN | 200990048 Y | 12/2007 |
| TW | M294580 | 7/2006 |

* cited by examiner

*Primary Examiner* — Benjamin Sandvik
*Assistant Examiner* — Joseph Schoenholtz
(74) *Attorney, Agent, or Firm* — Altis Law Group, Inc.

(57) ABSTRACT

An enclosure includes a back plate and a heat dissipating device. The back plate includes a plurality of locking members extending from the back plate. The heat dissipating device attached to the back plate and includes a plurality of fixing members engaging with the locking members.

6 Claims, 8 Drawing Sheets

FIG. 8

ENCLOSURE AND HEAT DISSIPATING DEVICE FOR THE SAME

BACKGROUND

1. Technical Field

The present invention relates to an enclosure and a heat dissipating device for use in the enclosure.

2. Description of Related Art

Nowadays, computers are widely used in life. Some components, such as expansion cards, circuit boards, and CPU in an enclosure of a computer, produce a great deal of heat that must be dissipated. A typical method for dissipating the heat is using heat-dissipating devices such as fans, heat pipes, and blowers mounted in the enclosure. The heat dissipating device is generally fixed to the enclosure by screws. However, the assembly or removal of the heat dissipating device to or from the enclosure is complicated, and the screws tend to be lost easily.

What is needed is to provide an enclosure and a heat dissipating device which can solve the above problem.

DETAILED DESCRIPTION

Figure 1:
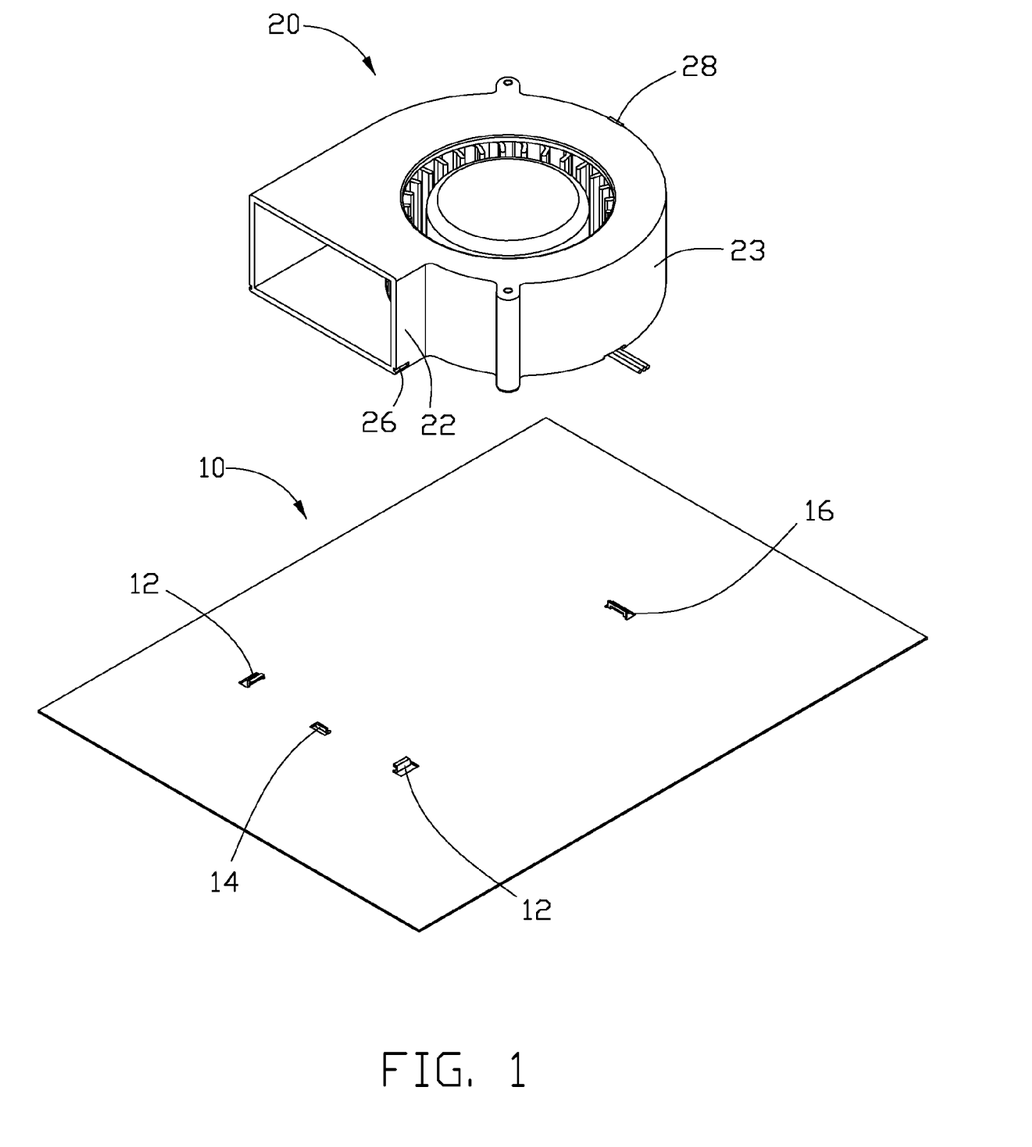
FIG. 1 is an exploded, isometric view of a first embodiment of an enclosure.
Figure 2:
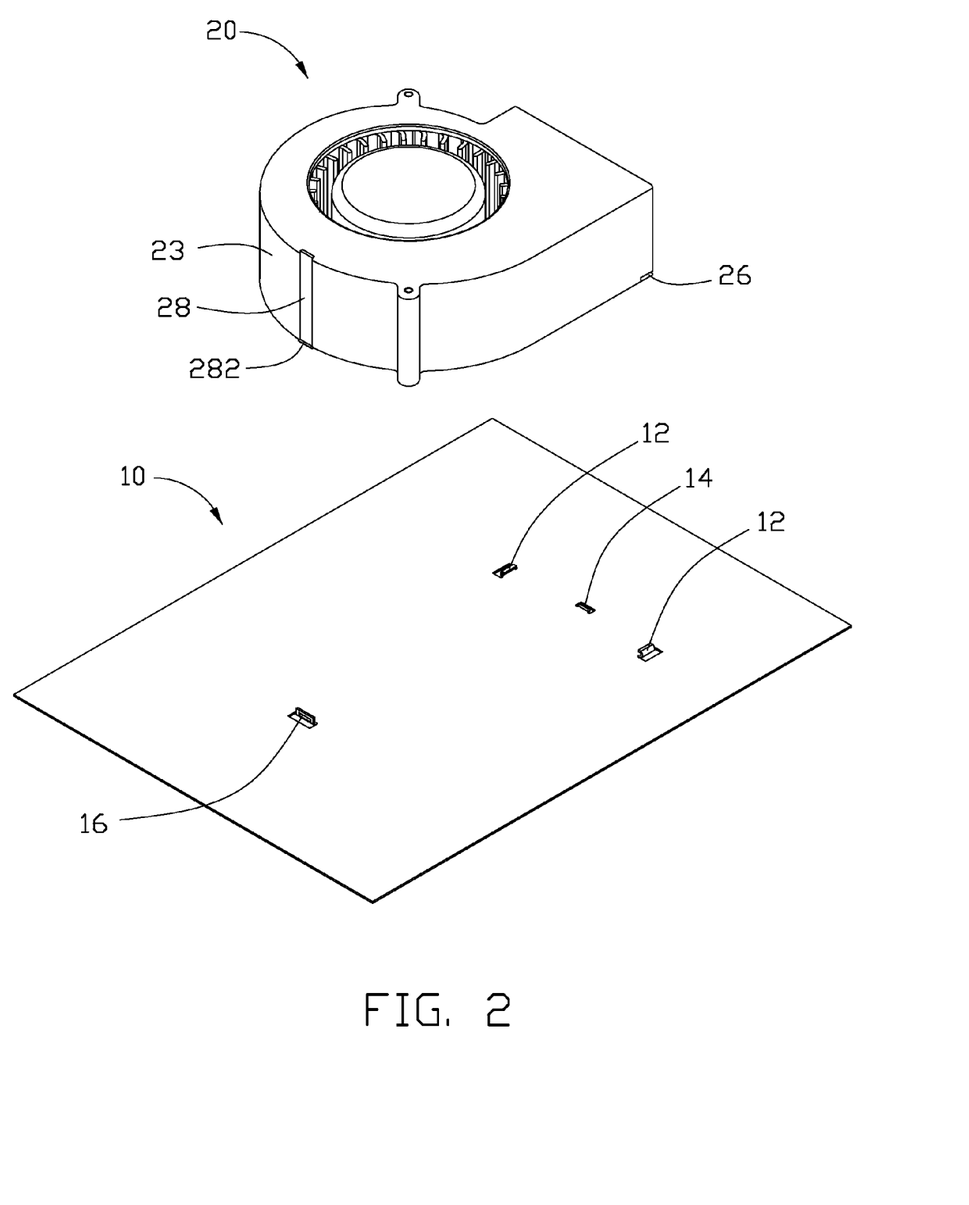
FIG. 2 is similar to FIG. 1, but viewed from another aspect.

Referring to FIGS. 1 and 2, a first embodiment of an enclosure includes a back plate 10 and a heat dissipating device including a plurality of fixing members. The back plate 10 includes a plurality of locking members configured to engage with the fixing members to fix the heat dissipating device to the back plate 10. The locking members include two spaced L-shaped first hooks 12 extending toward each other from the back plate 10 near one edge of the back plate 10, a second hook 14 extending from the back plate 10 between and substantially perpendicular to the two first hooks 12, and a clip 16 with a slot extending from the back plate 10 near an opposite edge of the back plate 10. In the first embodiment, the heat dissipating device is a blower 20 including a cylindrical main body 23, and a cubical outlet portion 22 defining an opening therein. The fixing members include a vertical rib 28 extending out from the main body 23, a horizontal tab 282 extending out from the rib 28, and a pair of horizontal slots 26 defined in lower parts of two opposite sidewalls of the outlet portion 22.

Figure 3:
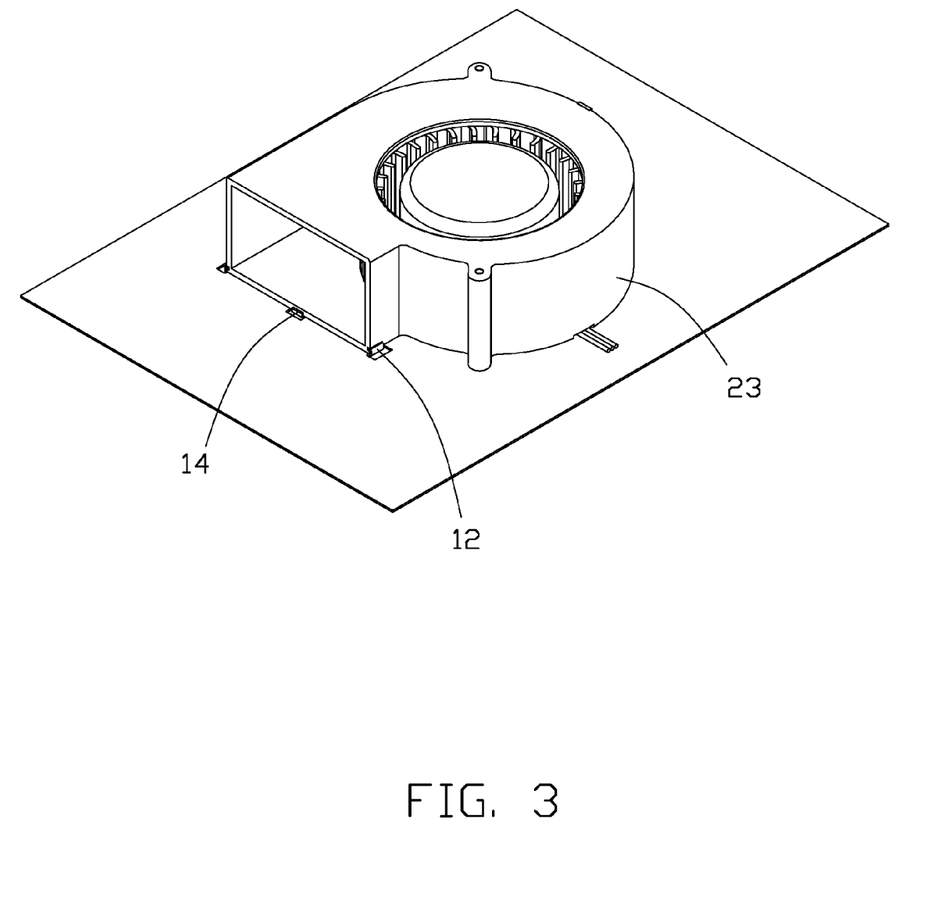
FIG. 3 is an assembled view of the enclosure of FIG. 1.
Figure 4:
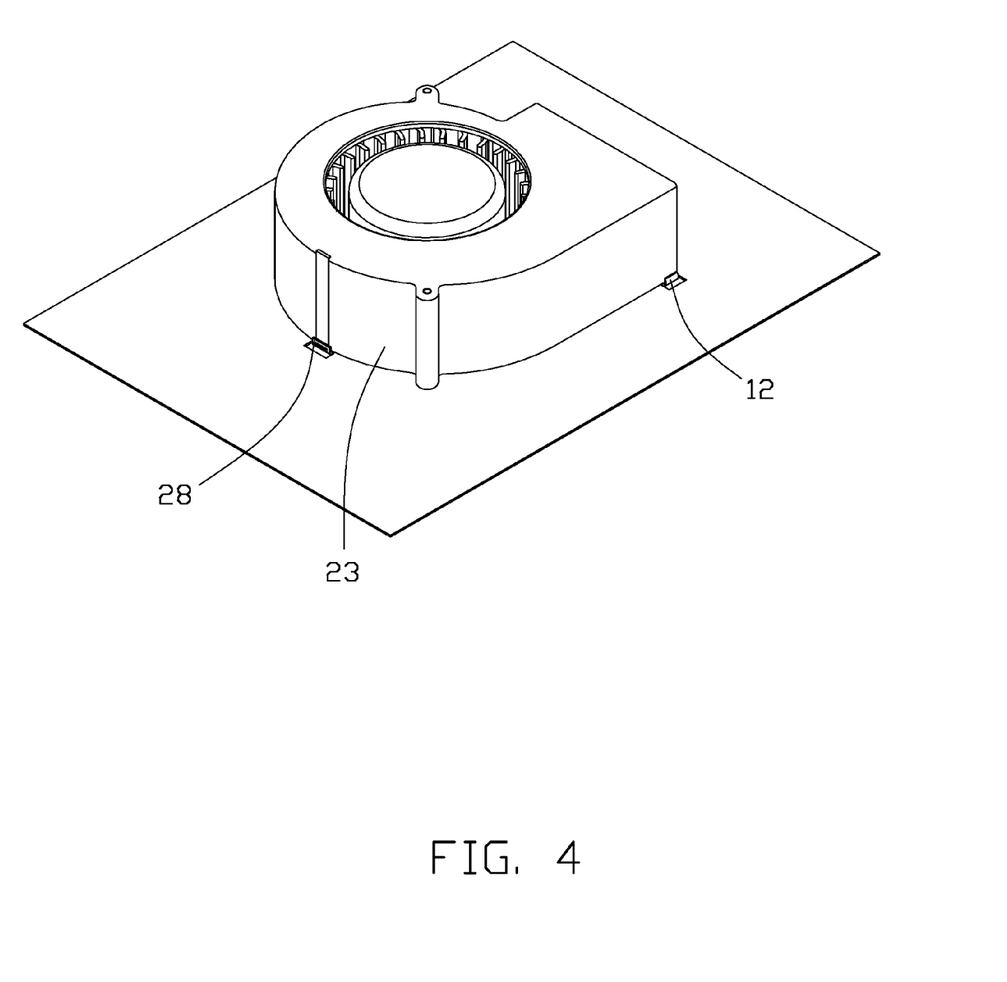
FIG. 4 is similar to FIG. 3, but viewed from another aspect.

Referring to FIGS. 3 and 4, the blower 20 is retained on the back plate 10 by placing the blower 20 on the back plate 10, engaging the first hooks 12 in the slots 26, abutting the second hook 14 against an outside end of the outlet portion 22, and engaging the tab 282 in the slot of the clip 16.

Figure 5:
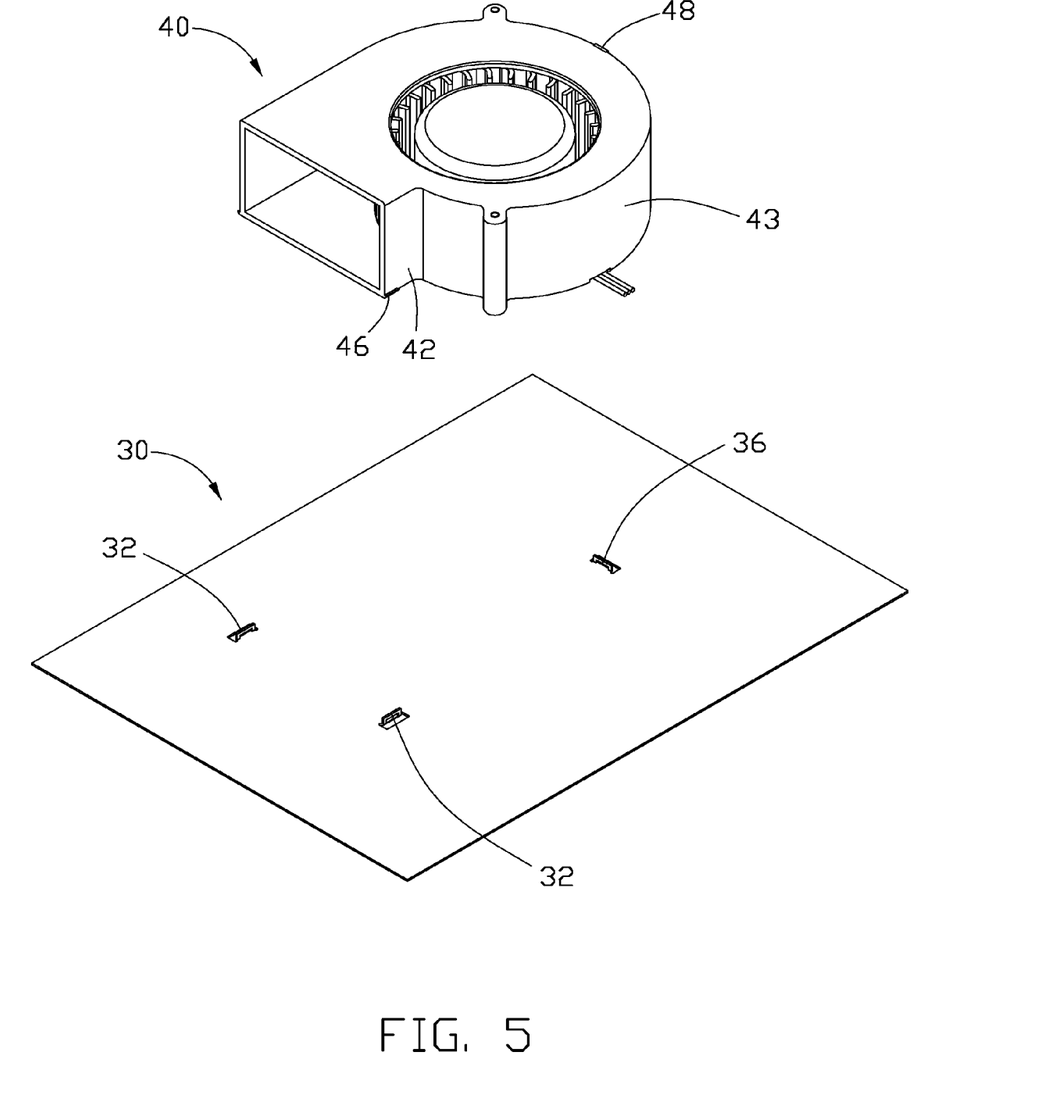
FIG. 5 is an exploded, isometric view of a second embodiment of an enclosure.

Referring to FIG. 5, a second embodiment of an enclosure includes a back plate 30 and a heat dissipating device including a plurality of fixing members. The back plate 30 includes a plurality of locking members configured to engage with the fixing members to fix the heat dissipating device to the back plate 30. Each locking member includes two substantially parallel first clips 32 extending from the back plate 30, and a second clip 36 extending from the back plate 30 substantially perpendicular to the first clips 32. Each first clip 32 and the second clip 36 define a slot therein. In the second embodiment, the heat dissipating device is a blower 40 including a cylindrical main body 43, and a cubical outlet portion 42 defining an opening therein. The fixing members include a vertical rib 48 extending out from the main body 43, a horizontal tab 482 (not shown) extending out from the rib 48, and a pair of horizontal tabs 46 extending out from lower parts of two opposite sidewalls of the outlet portion 42.

Figure 6:
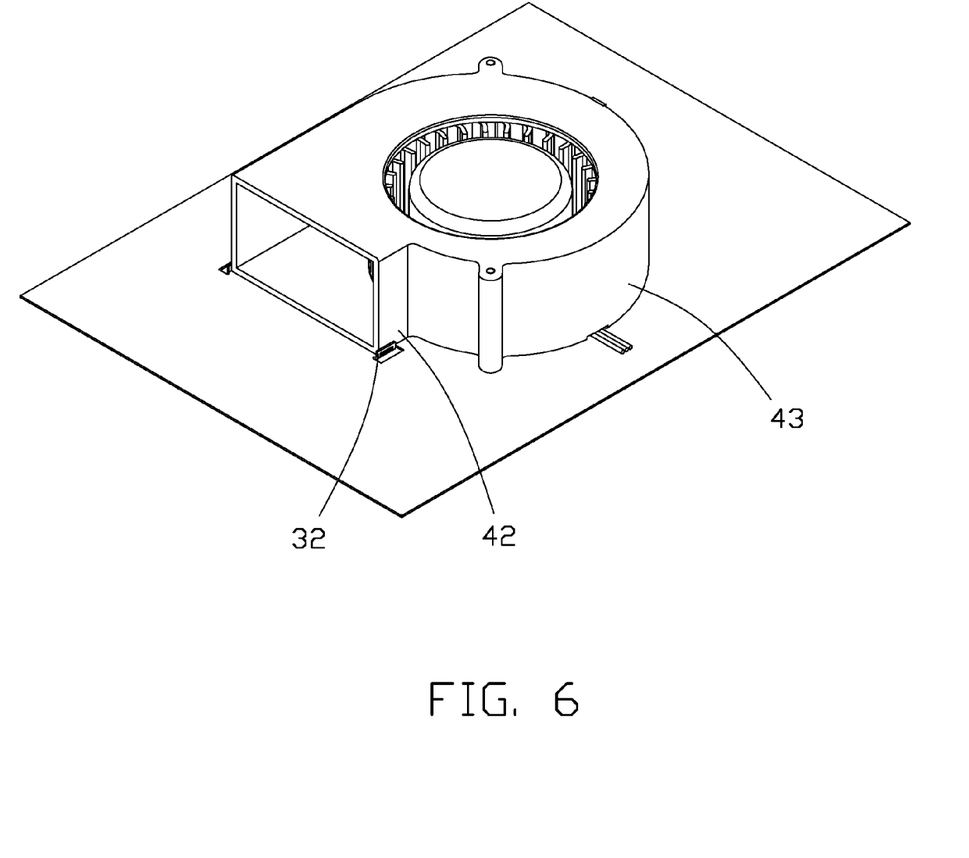
FIG. 6 is an assembled view of the enclosure of FIG. 5.

Referring to FIG. 6, the blower 40 is retained on the back plate by placing the blower 40 on the back plate 30, engaging the tabs 46 in the slots of the first clips 32, and engaging the tab 482 in the slot of the second clip 36.

Figure 7:
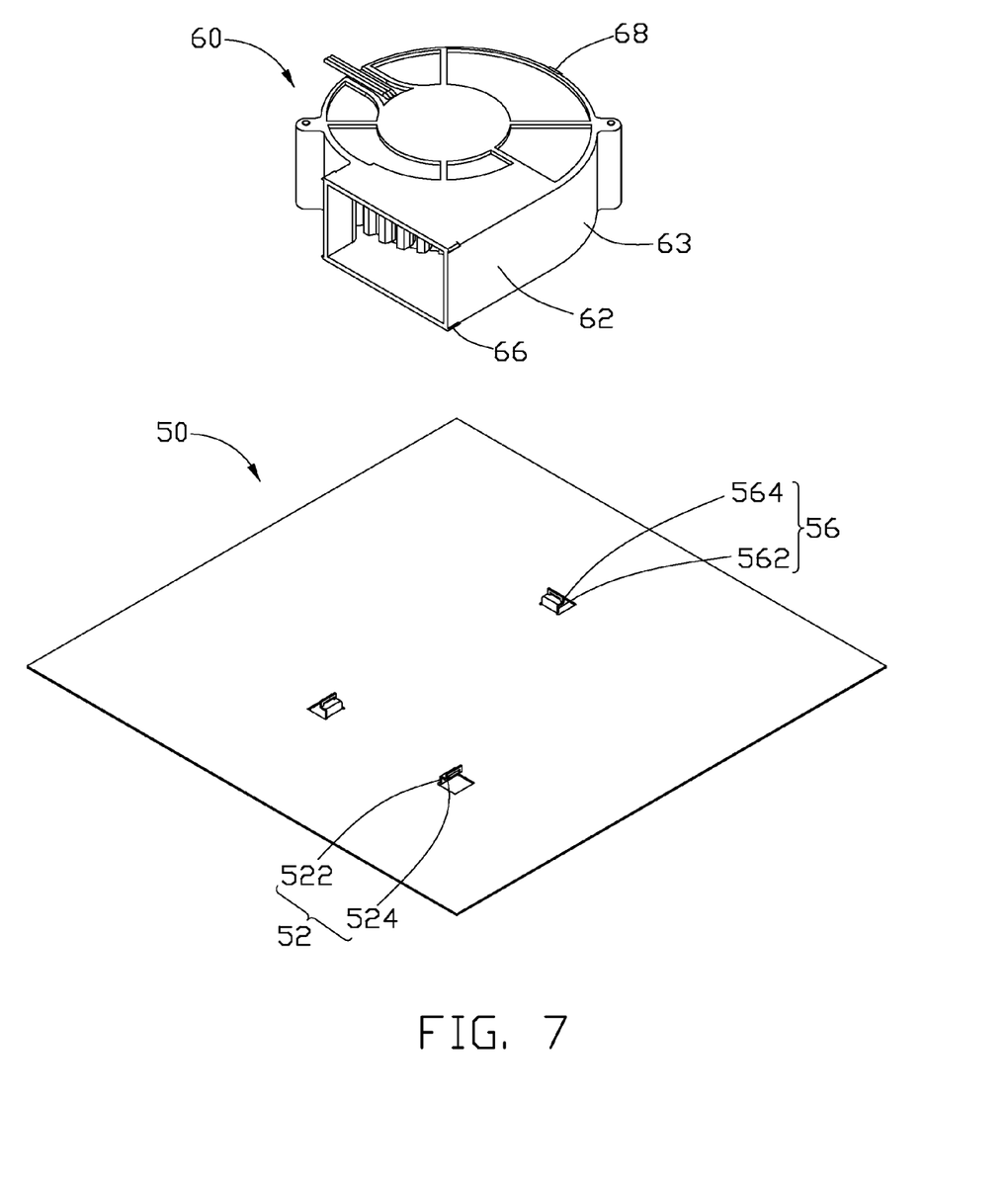
FIG. 7 is an exploded, isometric view of a third embodiment of an enclosure.

Referring to FIG. 7, a third embodiment of an enclosure includes a back plate 50, and a heat dissipating device including a plurality of fixing members. The back plate 50 includes a plurality of locking members configured to engage with the fixing members to fix the heat dissipating device to the back plate 50. The locking members includes two substantially parallel first clamps 52 extending from the back plate 50, and a second clamp 56 extending from the back plate 50 substantially perpendicular to the first clamps 52. Each of the first clamps 52 includes an inverted L-shaped support 522 and a clip 524 extending upward from the support 522. The second clamp 56 includes an inverted L-shaped support 562, and a clip 564 extending upward from the support 562. Each clip 524, 564 defines a slot therein. In the third embodiment, the heat dissipating device is a blower 60 including a cylindrical main body 63, and a cubical outlet portion 62 with an opening. The fixing members includes a vertical rib 68 extending out from a circumferential wall of the main body 63 corresponding to the opening, a horizontal tab 682 (not shown) extending out from the rib 68, and a pair of horizontal tabs 66 extending out from lower parts of two opposite sidewalls of the outlet portion 42.

Figure 8:
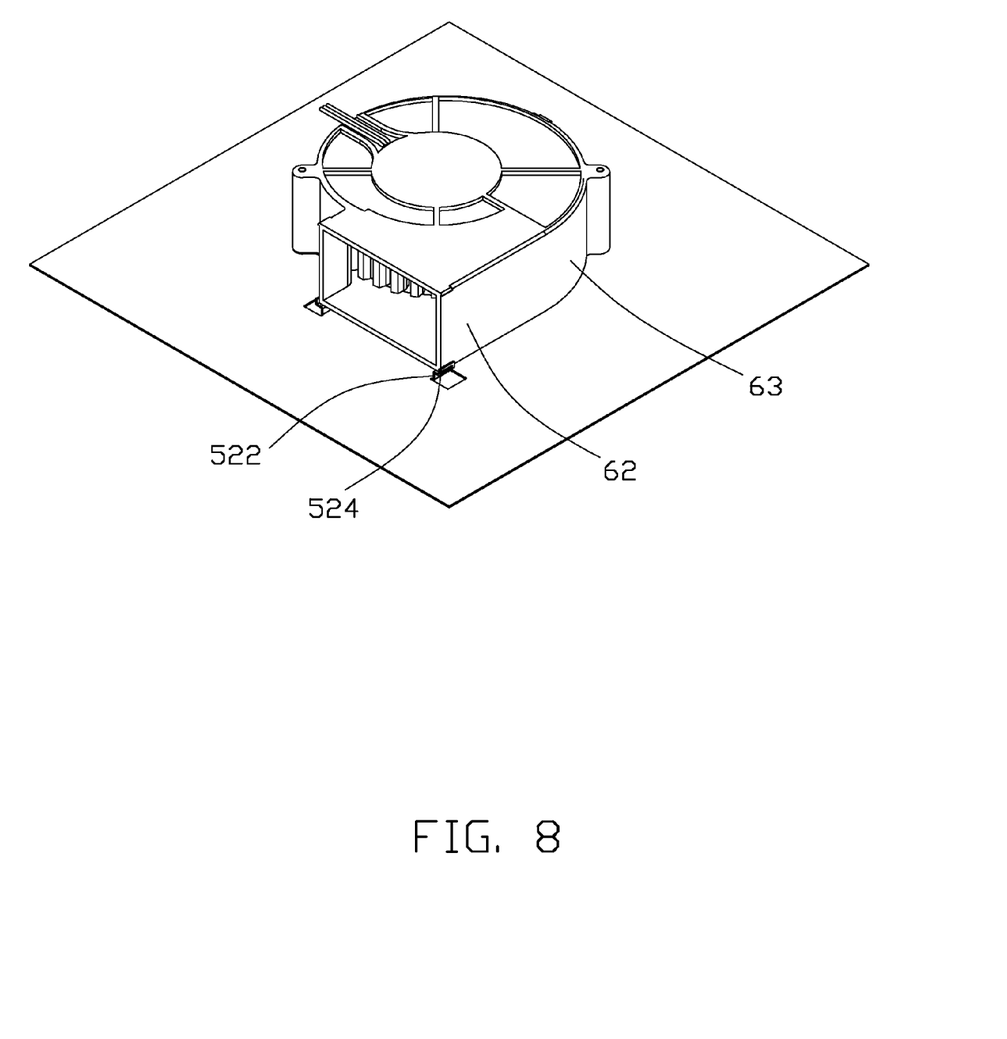
FIG. 8 is an assembled view of the enclosure of FIG. 7.

Referring to FIG. 8, the blower 60 is retained on the back plate 50 by seating the blower 60 on the supports 522, 562 engaging the tabs 66 in the slots of the clips 524, and engaging the tab 682 in the slot of the clip 564.

The number of the locking members of the enclosure and the fixing members of the heat dissipating device can be selected according to need, and the arrangement and the structure of the locking members and the fixing members also can be designed according to need. The heat dissipating device fixed to the enclosure by the locking members of the enclosure engage with the fixing members of the heat dissipating device. Therefore, the assembly or removal of the heat dissipating device to or from the enclosure is convenient.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An enclosure comprising:
    a back plate comprising a plurality of locking members extending from the back plate, wherein the locking members comprise two first hooks, a second hook, and a clip defining a slot therein; and
    a heat dissipating device attached to the back plate and comprising a plurality of fixing members engaging with the locking members, wherein the fixing members comprise a tab and two slots defined in the heat dissipating device, the first hooks engage in the slots, the second hook and the clip sandwich the heat dissipating device therebetween, the heat dissipating device is a blower comprising a cylindrical main body and a cubical outlet portion defining an opening therein, the fixing members further comprises a rib extending out from the main body, the tab extends out from the rib, the slots are defined in lower parts of opposite sidewalls of the outlet portion, and the tab engages in the slot of the clip and the second hook abuts against an outside end of the outlet portion.

2. The enclosure as claimed in claim 1, wherein the first hooks extend toward each other, the second hook extends from the back plate an positioned between and substantially perpendicular to the two first hooks, and the clip extends from the back plate substantially parallel to the second hook.

3. A heat dissipating device, comprising:
a cylindrical main body;
a cubical outlet portion defining an opening therein; and
a plurality of fixing members extending from the cylindrical main body and the cubical outlet portion, wherein the fixing members comprises two first tabs extending out from opposite sidewalls of the outlet portion, a rib extending out from the main body, and a second tab extends out from the rib.

4. An enclosure comprising:
a back plate comprising a plurality of locking members extending from the back plate, wherein the locking members comprise two first clamps and a second clamp, and each of the first and second clamps comprises a support and a clip defining a slot therein and extending from the support; and
a heat dissipating device attached to the back plate and comprising a plurality of fixing members engaging with the locking members, wherein the heat dissipating device is seated on the supports; the fixing members comprise two first tabs and a second tab, the first tabs engage in the slots of the clips of the first clamps, and the second tab engages in the slot of the clip of the second clamp.

5. The enclosure as claimed in claim 4, wherein the first clamps extend from the back plate, and the second clamp extends from the back plate substantially perpendicular to the first clamps.

6. The enclosure as claimed in claim 4, wherein the heat dissipating device is a blower comprising a cylindrical main body and a cubical outlet portion defining an opening therein; the fixing members further comprises a rib extending out from the main body; the second tab extends out from the rib; and the first tabs extend out from opposite sidewalls of the outlet portion.

\* \* \* \* \*